US008706675B1

(12) United States Patent
Samaniego et al.

(10) Patent No.: US 8,706,675 B1
(45) Date of Patent: Apr. 22, 2014

(54) VIDEO CONTENT CLAIMING CLASSIFIER

(75) Inventors: Clifford Samaniego, Mountain View, CA (US); David G. King, San Francisco, CA (US); David A. Ross, San Jose, CA (US); Alexander Joshua Frank, Mountain View, CA (US); Omid Madani, San Carlos, CA (US); Kenji Arai, Santa Clara, CA (US); Ruei-Sung Lin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 13/220,378

(22) Filed: Aug. 29, 2011

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
None
See application file for complete search history.

(56) References Cited

U.S. PATENT DOCUMENTS

| 8,396,286 | B1 * | 3/2013 | Aradhye et al. | 382/159 |
| 8,533,134 | B1 * | 9/2013 | Zhao et al. | 706/12 |
| 2011/0085079 | A1 * | 4/2011 | Ruggiero | 348/448 |

OTHER PUBLICATIONS

Chou et al. "A Hierarchical multi-classifier learning algorithm", Pattern Anal Applic, 2003, 6: 150-168.*

Anderson, R., A local algorithm for finding dense subgraphs, In Proc. 19th Annual ACM-SIAM Symposium on Discrete Algorithms, 2008, pp. 1003-1009.
Blum, A. et al., "Combining labeled and unlabeled data with co-training," In Proc. 11th Annual Conference on Computational Learning Theory, COLT, Jul. 1998, pp. 92-100.
Davison, B. D., "Topical locality in the web," In Proc. 23rd Annual International ACM SIGIR Conference on Research and Development in Information Retrieval, 2004, pp. 272-279.
Dekel, O., et al., "Large margin hierarchical classification," Proceedings of the 21 st International Conference on Machine Learning, Banff, Canada, 2004, 8 pages.
Deng, J., et al., "ImageNet: A Large-Scale Hierarchical Image Database," IEEE Computer Society Conference on Computer Vision and Pattern Recognition, Jun. 22, 2009, pp. 248-255.
Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.
Fan, R.-E., et al., "Liblinear: A library for large linear classification," Journal of Machine Learning Research, 2008, pp. 1871-1874, vol. 9.
Freund, Y., et al., "A decision-theoretic generalization of on-line learning and an application to Boosting," Journal of Computer and System Sciences, 1997, pp. 119-139, vol. 55, article No. SS971504.
Goldman, S., et al., "Enhancing supervised learning with unlabeled data," In Proc. $17^{th}$ International Conference on Machine Learning, 2000, pp. 327-334.

(Continued)

*Primary Examiner* — Li-Wu Chang
(74) *Attorney, Agent, or Firm* — Fenwick & West LLP

(57) ABSTRACT

A video hosting service comprising video classifiers that identify content sources of content included in videos uploaded to the video hosting service. Identifying the content source allows a content owner of the content source to claim ownership of videos that include content based on the content source. Usage policies associated with the content owners are applied to the uploaded videos that describe how the video hosting service is to treat the videos.

30 Claims, 7 Drawing Sheets

(56) References Cited

OTHER PUBLICATIONS

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 Pages.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Neapolitan, R. E., et al., "Learning Bayesian Networks," Prentice-Hall, Inc., Upper Saddle River, NJ, USA, 2003, Cover page and Table of Contents, 7 Pages.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

\* cited by examiner

VIDEO CONTENT CLAIMING CLASSIFIER

BACKGROUND

1. Field of Art

The present disclosure generally relates to the field of digital video, and more specifically, to training video classifiers to identify videos to allow for content claiming by content owners.

2. Background of the Invention

Video hosting services, such as YOUTUBE™, have become an increasingly popular way of sharing and viewing digital videos, with users contributing tens of millions of videos each year.

Some video hosting services use fingerprints or signatures to match uploaded videos to reference videos. Fingerprints are adequate to identify broadcast-type content because there exists a reference version of the broadcast content from which a reference fingerprint can be derived, and the content does not vary drastically between each copy or instance of the content. Examples of broadcast type content comprise official music videos, television content, movie content, broadcasted sports events etc. By comparing fingerprints of uploaded videos to fingerprints of reference videos, video hosting services may determine if a video matches a reference video.

However, it is difficult to develop fingerprints for content for which there is no reference version from which a reference fingerprint can be generated. One example of such content are videos of events that are captured from the point of view of the person participating or observing the event (referred to herein as "participant-observer videos" or "P/O videos") because the content in the videos vary from video to video. This prevents video hosting services from identifying the source of the content included in P/O videos. For example, dozens of different users may create a video of particular concert (e.g., a content source), each taken from a different seat in the concert hall. While all of these videos are of the same event, each video is itself different from the other videos in its specific video and audio content. As a result, conventional fingerprinting methods would not identify these videos as matching.

SUMMARY

The embodiments disclosed herein generally describe a video hosting service using a video classifier system that matches videos, where the videos are such that there is no reference content from which a reference fingerprint can be generated for matching against other videos of the same or similar underlying content. In one embodiment, the videos identified by the video classifiers include a particular classification of content—P/O content. Identifying the content source of P/O content in videos is difficult because the specific content varies from video to video even though the videos capture the same or similar underlying content. In one embodiment, the content source describes the media content from which content in P/O videos is based.

An example of P/O videos are videos of a sporting event taken by users at a number of different vantage points, such as different seats in a stadium, arena, track, and so forth. Another example of P/O videos are videos of gameplay of a computer generated video game, where the gameplay varies depending on the user playing the game; since each user's gameplay will be different from other users, videos of such gameplay will differ as well. The video classifier systems identifies the content source shown in P/O videos using feature information (e.g., video and audio information, as well as metadata such a title, description, keywords, etc.). In one embodiment, the system allows the content owners to claim the videos as their own. Usage policies associated with the videos are identified. The usage policies comprise rules describing actions to apply to the claimed content.

In order to identify content sources of content included in P/O videos uploaded to the video hosting service, the video classification system includes a collection of instance classifiers. Each instance classifier is trained to recognize a content source shown in a training set of videos that is associated with the instance classifier. For example, one instance classifier may be trained to identify gameplay of the video game content source "Super Duper Game" whereas another instance classifier may be trained to identify gameplay of the video game content source "The Legend of Zimra."

The video classifier system extracts descriptive representations of the videos in the training set. The extracted features comprise audiovisual features as well as textual features which are used to form one or more feature vectors. The video classifier system inputs the feature vector(s) into a training algorithm which trains the instance classifier to recognize the content source included in the positive training videos. Thus, once the collection of instance classifiers is trained, each instance classifier is used to score uploaded videos. That is, given a feature vector of an uploaded video, each instance classifier outputs a classification score which indicates a measure of likelihood that the content in the video is of the content source associated with the instance classifier that generated the classification score. In one embodiment, the instance classifier that produces a most significant (e.g., highest) classification score for a given video represents the content source that is the likely basis of the P/O video. Alternatively, if a plurality of instance classifiers produced classification scores indicating that the content in the video is of the content sources associated with the instance classifiers, the P/O video is likely to comprise content from multiple content sources. Thus, there may be multiple content owners for the video. The video classifier system can thereby identify the content source of content included in uploaded videos and their associated content owners as previously mentioned above.

In one embodiment, the video classifier system also includes a collection of genre classifiers, forming a two tier classifier system, with the genre classifiers forming a first classification tier, and the instance classifiers forming a second classification tier. Each genre classifier is trained to recognize content of a particular genre of content using a training set associated with the genre classifier. For example, a genre classifier can be trained to identify videos of racing video games, a different genre classifier trained to identify videos of combat video games, and another genre classifier used to identify sports video games. The collection of genre classifiers are trained in a similar manner as the collection of instance classifiers previously described above, but using for each genre classifier, examples of different instances of the videos within the genre.

In this embodiment, after the collection of genre classifiers is trained, an uploaded video is inputted into a plurality of the genre classifiers. Each genre classifier generates genre information describing a genre score. A genre score indicates a measure of likelihood that the content in the video is of the genre associated with the genre classifier that generated the genre score. In one embodiment, the genre scores generated by the genre classifiers are provided to the instance classifiers in order to augment the feature vector provided to each instance classifier. Alternatively, given the genre scores, the most significant (e.g., highest) scoring genre can be determined. The uploaded video is then input into the instance classifiers of that particular genre, to recognize the particular content source within that genre. For example, an unidentified video can be first identified by the genre classifiers as a video of a racing video game, and then input into a plurality of instance classifiers for different racing video games (e.g., Grand Racing, Race!, Fast), to identify the particular video game (i.e., the content source) from which the P/O video was made. Once that identification is made, the usage policy associated with the content source is determined. The usage policy can then be enforced in regards to the presentation of the P/O video on the video hosting service.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
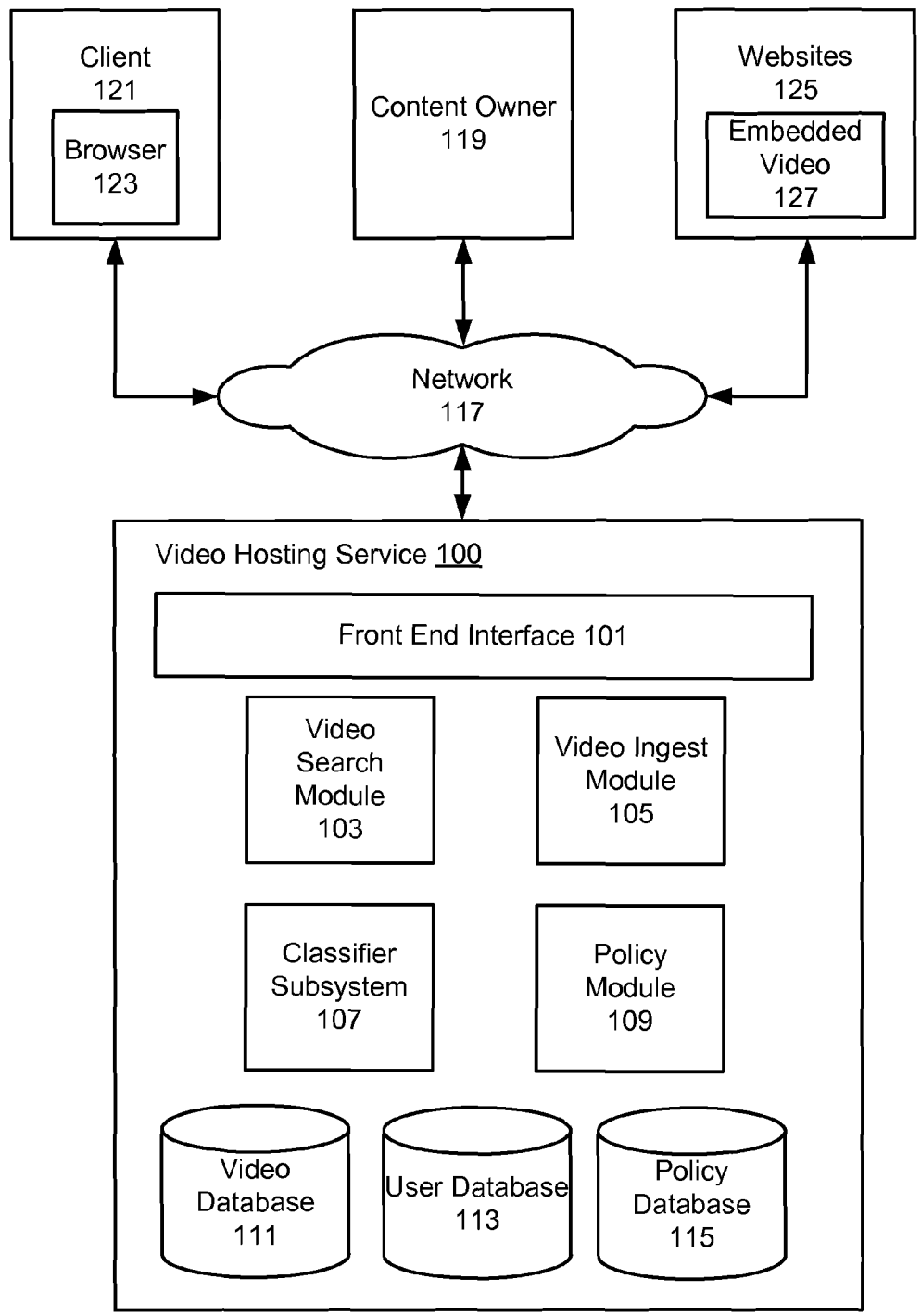
FIG. 1 illustrates a video hosting service, according to one embodiment.

FIG. 1 illustrates a system architecture for a video hosting service 100 in accordance with one embodiment. Generally, the video hosting service 100 is configured to automatically identify usage policies associated with content included in videos that are uploaded to the video hosting service 100 by users other than the content owners 119 that own the rights to the content. Identification of the usage policies allows the content owners 119 to claim their content that is uploaded to the video hosting service 100. The video hosting service 100 identifies the content source of videos for which there are no reference videos (and hence reference fingerprints) available. In one embodiment, the content source describes the media content from which the content in the videos is based. One particular class of such videos are participant-observer videos ("P/O videos"). P/O videos are generally recordings that vary from video to video even though the videos capture the same or a similar underlying content source. In one embodiment, a P/O video comprises content captured from the point of view of the person participating or observing the event where the event is the content source. The content source can be a content event (e.g., a live event such as a sporting event, musical performance, stage performance) for which a content owner has one or more ownership rights, such as a performance right, display right, and/or recording right under copyright law. For example, artists have performance and recording rights in their performances, and thus can claim ownership in recordings of their performances that are made by others. Similarly, professional sporting organizations (e.g. Major League Baseball, National Football League) have ownership rights in the sporting events that they produce. The content source can also be a generative content source, such as a video game, computer program, or the like, in which the owner of the generative content source has one or more ownership rights. Note that although the following description is discussed with respect to P/O videos, the video classification system described herein can be applied to any class of videos. Hereafter, P/O videos may be referred to simply as "videos" for convenience.

Examples of P/O videos include videos of gameplay of computer animated or generated video games. Although P/O videos of video gameplay of a given video game share the same underlying content (e.g., Super Duper Game content), there are significant variances in the movement of the characters, the particular stage or level of gameplay, and other factors, in the video game from one video to the next, making it difficult to positively identify what content source is the basis for the content included in these P/O videos using only fingerprints. This is in part because it is impossible to generate beforehand all of the possible fingerprints that would be necessary to identify every possible video of every possible game sequence for a given video game. Other examples of P/O videos include videos of live sporting events captured from the perspective of a person that is not associated with the television broadcast of the sporting events, videos of live concerts, and animation videos created using animation engines which allow users to create custom animation such as those found at www.xtranormal.com.

The video hosting service 100 is further configured to identify the content owner(s) 119 of a given content source. The video hosting server 100 also is configured to identify a usage policy for the identified content owner and/or the content source. Note that a content owner 119 may have different policies for each content source owned by the content owner or a single policy applied to all of the content owned by the content owner. In one embodiment, the usage policy describes a set of rules governing how videos derived from the content source should be treated by the video hosting service 100, as will be further described below. The video hosting server 100 applies the usage policy on the uploaded videos according to the rules defined in the policy.

As shown in FIG. 1, the video hosting service 100 includes a front end interface 101, a video search module 103, a video ingest module 105, a classifier subsystem 107, a policy module 109, a video database 111, a user database 113, and a policy database 115. Many conventional features, such as firewalls, load balancers, application servers, failover servers, site management tools and so forth are not shown so as not to obscure the features of the system.

In one embodiment, a suitable website for implementation of the video hosting service 100 is the YOUTUBE™ website, found at www.youtube.com. Other video hosting sites are known as well, and can be adapted to operate according to the teaching disclosed herein. It will be understood that the term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the video hosting service 100 is implemented as server program executing on a server-class computer comprising of a CPU, memory, network interface, peripheral interfaces, and other well known components. In one embodiment, the computers themselves run an operating system such as LINUX, Microsoft Windows, or Mac OS X, have generally high performance CPUs, 2G or more of memory, and 1 TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media).

In one embodiment, and as shown in FIG. 1, a client 121 executing a browser 123 connects to the video hosting service 100 to view videos via a network 117 such as the Internet or any combination of a LAN, a MAN, a WAN, a mobile, wired or wireless network, a private network, or a virtual private network. A user of client 121 may also upload videos to the video hosting service 100. While only a single client 121 and browser 123 is shown in FIG. 1, in general very large numbers (e.g., millions) of clients are supported and can be in communication with the video hosting server 100 at any time. In one embodiment, the client 121 can be implemented using any of a variety of different computing devices, some examples of which are personal computers, digital assistants, personal digital assistants, cellular phones, mobile phones, smart phones and laptop computers.

The browser 123 may include any application that allows users of clients 121 to access web pages on the World Wide Web. Suitable applications include, but are not limited to GOOGLE CHROME, MICROSOFT INTERNET EXPLORER, NETSCAPE NAVIGATOR, MOZILLA FIREFOX, and APPLE SAFARI. The browser 123 can also include a video player (e.g., Flash™ from Adobe Systems, Inc.), or any other media player adapted to play one or more videos hosted on video hosting service 100. Alternatively, videos can be accessed by a standalone program separate from the browser 123, such as Apple QuickTime, Microsoft Media Player, or other applications designed for media playback.

The browser 123 allows the user of client 121 to access videos from the video hosting service 100 via a user interface provided by the front end interface 101. Through the interface, a user can locate videos hosted on video hosting service 100 by browsing a catalog of videos, conducting keyword searches, reviewing video lists provided by other users or the system administrator (e.g., collections of videos forming channels), or by reviewing videos associated with particular user groups (e.g., communities). The browser 123 also enables a user to access a video indirectly, for example, via an embedded hyperlink in an email message or through a third party website 125 in which a video 127 is embedded.

A content owner 119 in communication with the video hosting service 100 is an entity that owns or controls at least some of the rights to a particular content included in a video. The content owner 119 may be an individual, a group of individuals, or an entity such as a music or video production company, studio or artists' group, sports league, video game publisher, television video broadcaster, or internet video broadcaster. Generally, the content owner 119 claims videos uploaded by clients 121 that include content owned by the content owner 119. In one embodiment, the content owner 119 may also provide videos owned by the content owner 119 to the video hosting service 100 via the network 117. While only one content provider 185 is shown, it is understood that any number of content providers are supported and can be in communication with the video hosting website 100 at any time.

In one embodiment, the content owner 119 provides training data to the video hosting service 100. Specifically, the content owner 119 provides training data that is representative of a content source owned by the content owner 119. As will be described in further detail below, the training data is used to train a video classifier to identify the content source associated with the training data. For example, the content owner 119 may provide a number of videos (e.g., 1,000 videos) depicting gameplay for the video game content source "Super Duper Game" In one embodiment, the training data comprises audiovisual content, such as a plurality of videos that describes the content source associated with the training data. The training data may also comprise text metadata that describes the video such as title of the videos, characters displayed in the video, or keywords describing the genre of the video such as "action" in the "Super Duper Game" game content source example. The training data may also include category information, such as category identifiers referencing a category or topic taxonomy, cluster identifiers referencing clusters of videos, or other tokens derived from analysis of populations of videos.

The policy database 115 stores information relating content owners 119 to their usage policies. The policy database 115 includes a list of content sources where each content source is associated with its corresponding content owner 119. The list of content sources may also include a collection of video IDs that are associated with each content source in the list. The policy database 115 also maps each content source to an associated usage policy. The policy database 115 is indexed to allow lookups of the usage policies by content source, content owner, or video ID.

In one embodiment, a usage policy describes a set of rules governing how a content provider's content should be handled by the video hosting service 100. The usage policy may be applied to all content associated with the content owner 119. Thus, the content owner 119 may have a single usage policy that is applied to all videos including content based on the content sources associated with the content owner 119. Alternatively, the usage policy can be specific to individual content sources. For example, a content owner 119 may own rights to two different video games and have an associated usage policy for each game.

In one embodiment, a usage policy includes a rule that videos comprising content claimed by the content owner 119 should be monetized. Monetization of a video indicates that the video hosting service 119 is to provide advertisements for display in conjunction with the monetized videos. The advertisements may include any type of advertisements such as advertisement overlays, in-stream advertisements, banner advertisements, etc. that are displayed either before, during, or after the display of the video. In one embodiment, the usage policy for a content owner 119 may also indicate the type of advertisements that may be displayed with content owned by the content owner 119. The monetization rule can be applied selectively, with additional conditions defining the type of monetization based on the geographic region of the uploading user. For example, where the associated video content is uploaded from within the U.S., the monetization rule can require an advertisement for a U.S. distributed product, whereas if the associated video content is uploaded from a second, different country, the monetization rule can require a different advertisement for a different product distributed in that second country.

In one embodiment, the usage policy of a content owner 119 includes a rule that videos including their content should be blocked for display by the video hosting service 100. Thus, the content owner 119 prohibits the video hosting service 100 from displaying their associated content on the video hosting service 100. The block rule may be applied selectively to only particular items of associated content if certain conditions are met. For example, the content owner 119 may specify that only videos uploaded by users other than the content owner 119 should be blocked by the video hosting service 100. This allows the video hosting service 100 to display content owned by the content owner 119 only when the content owner 119 uploaded the content to the video hosting service 100. Another selective blocking rule would to block only videos uploaded from a particular geographic region (e.g., from outside of the U.S.).

Alternatively, the usage policy of a content owner 119 includes a rule that the content should be tracked. In one embodiment, tracking usage of a video comprises monitoring user interaction with the video by users of the video hosting service 100. Thus, the content owner 119 grants the video hosting service 100 the permission to display content associated with the content owner 119. By tracking the usage of the content on the video hosting service 100, the video hosting service 100 generates interaction statistics. The interaction statistics describe any interaction that provides a meaningful insight as to whether users liked or disliked the video or advertisements provided with the video, or any other type of statistic or metric based on viewer engagement with the video. Based on the interaction statistics, the content owner 119 may determine whether to monetize the content.

In one embodiment, tracking usage of content also comprises monitoring the top sources of traffic for the content such as whether resulting views of the content were referred from a website associated with the video hosting service 100, other websites, or mobile applications. Tracking usage of the content may also comprise monitoring for the top playback locations for the content such as the watch page for the website provided by the video hosting service 100 or an embedded player on another website. Additionally, tracking usage of the content comprises tracking the demographics of the viewers of the content, ratings associated with the content, the total number or frequency in which the content has been added to a "favorite" list of users, comments on the content, and/or how often the content was shared from one user to another.

In one embodiment, the user database 113 stores a record of user searches, browsing, and viewing activities on the video hosting service 100. The user information is preferably anonymized to maintain user privacy.

The video database 111 contains videos submitted to the video hosting service 100 by content owners 119 and users of clients 121. The video database 111 can contain any number of videos, such as tens of thousands or hundreds of millions. Each of the videos has a unique video identifier that distinguishes it from each of the other videos, such as a textual name (e.g., the string "a91qrx8"), an integer, or any other way of uniquely naming a video. The videos can be packaged in various containers such as AV1, MP4, FLV, F4V, WebM, or MOV, and can be encoded using video codecs such as MPEG-2, MPEG-4, H.264, VP8, and the like. In addition to their audiovisual content, the videos further have associated metadata, e.g., textual metadata such as a title, description, and/or tags provided the entity that uploaded the video. In one embodiment, the video database 111 comprises an indication of a given video's usage policy as will be described in further detail below.

In one embodiment, uploaded videos provided by content owners 119 and users of clients 121 are processed by a video ingest module 105 at the video hosting service 100 for storage in the video database 111. The processing can include video format conversion (transcoding), compression, metadata tagging, as well as other data processing. The video ingest module 105 processes the videos in order to standardize content for playback to users of client 121. In particular, transcoding the videos from one format to another enables the video hosting service 100 to receive uploaded videos of various formats, and to provide the videos in a standardized output format to users of client 121. Once uploaded videos have been formatted, the video ingest module 105 stores the videos in the video database 111.

In one embodiment, search requests for videos are received by the front end interface 101 and are provided to the video search module 103. The video search module 103 searches the video database 111 for videos that satisfy the search request. The video search module 103 supports searching on any data field that is associated with a video stored in video database 111. Such data fields can include, for example, a video's title, description, tags, author, category, comment, and so forth.

The video hosting service 100 further comprises a video classifier subsystem 107. The classifier subsystem 107 trains a set of video classifiers based on the training data provided by the content owners 119. The video classifiers can be either instance classifiers, or a combination of instance classifiers and genre classifiers. Once the video classifiers are trained, the classifier subsystem 107 identifies the content source (e.g., a title of the content source) of the content included in videos uploaded to the video hosting service 100. Particularly the classifier subsystem 107 is trained to identify the content source associated with the content included in videos.

The policy module 109 identifies usage policies from the policy database 115 that are associated with uploaded videos. When the content source of an uploaded video is identified, the policy module 109 identifies the content owner's usage policy that is associated with the content source. The policy module 109 associates the usage policy with the uploaded video by updating the record for the uploaded video in the video database 111. The policy module 109 updates the record to indicate the video's associated usage policy and the parameters of the policy. During serving of the video, the policy of the video is determined and implemented.

Classifier Subsystem

Figure 2:
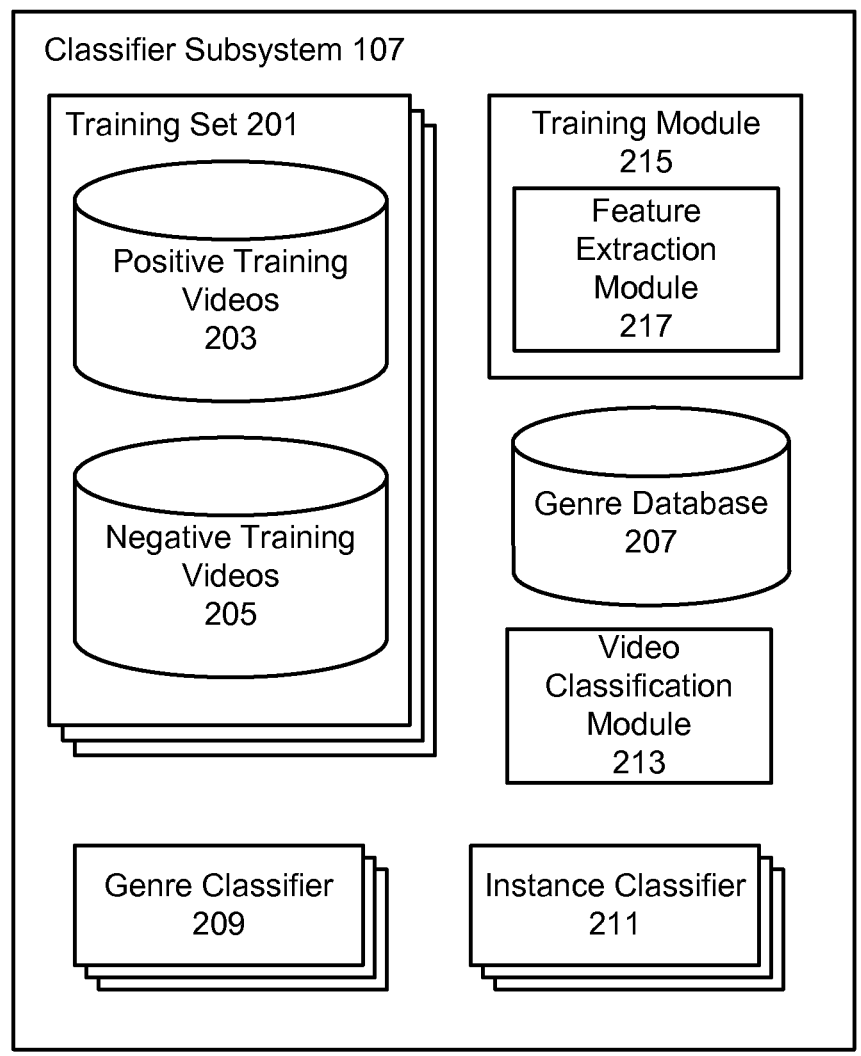
FIG. 2 illustrates a detailed view of a classifier subsystem of the video hosting service, according to one embodiment.

FIG. 2 illustrates the various components of the classifier subsystem 107 according to one embodiment. Note that in other embodiments, the classifier subsystem 107 may include other components than those illustrated in FIG. 2.

The classifier subsystem 107 comprises a collection of training sets 201 of videos provided by content owners 119, or any other authoritative source. A training set 201 represents some subset of the videos stored in the video database 111, and can also include videos not found in the database 111, but representative of the content source for which the classifier(s) are to be trained. In one embodiment, each training set 201 is associated with particular content source owned by a content owner 119 and is used to train video classifiers to recognize that particular content source.

Each training set 201 comprises positive training videos 203. The positive training videos 203 include a threshold number of videos such as 1,000 videos for example. For example, a training set 201 may comprise positive training videos 203 of gameplay of the video game content source "Super Duper Game"

Each positive video in the positive training videos 203 comprises audiovisual content and/or text metadata that describe the content source associated with the training set 201. To assemble the positive training videos 203, the video hosting service 100 may receive a search query from the content owner 119 including one or more keywords associated with the content source. The keywords may comprise a title of the content, characters displayed in the content, a genre associated with the content, or any other types of textual information. The video hosting service 100 returns to the content owner 119 a collection of videos that satisfy the query (i.e., search results). The video hosting service 100 receives from the content owner 119 a selection of videos from the collection that represent the content source owned by the content owner 119.

For example, consider the video game content source "Super Duper Game" The video hosting service 100 may receive a search query from the content owner 119 associated with the video game that includes the title of the game as the query. The video hosting service 100 provides a collection of videos that satisfy the query for "Super Duper Game." The video hosting service 100 receives from the content owner 119 a selection of the videos from the collection that represent gameplay of "Super Duper Game" content source.

Alternatively, the classifier subsystem 107 receives uploaded videos from the content provider 119 for inclusion in the positive training videos 203. A content owner 119 may create and upload a threshold number of videos (e.g., 1,000 videos) that are representative of the content source owned by the provider 119. Alternatively, the content owner 119 creates a single video of a threshold length (e.g., 2 hours) that is representative of their content source. The classifier subsystem 107 can segment the video into a plurality of videos to include in the positive training videos 203.

The classifier subsystem 107 may also automatically identify videos from the video database 111 to use as positive training videos 203 for a particular content source. The classifier subsystem 107 receives from the content owner 119 a keyword such as a title of the content or an identification (ID) number associated with the content source. The classifier subsystem 107 searches the video database 111 for videos that match the keyword. In one embodiment, the set of videos that match the keyword are used as positive training videos 203 for the content source associated with the content owner 119. For example, the classifier subsystem may automatically search for videos associated with the title "Super Duper Game"

The classifier subsystem 107 may also identify positive training videos 203 for a content source based on data licensed from a third party. The classifier subsystem 107 may access a list of content titles such as a list of video game titles that is provided by the third party. For each title in the list, the classifier subsystem 107 identifies a video category in the video database 111 that matches the type of content included in the list. For example, the classifier subsystem identifies the category "Gaming" for the list of video game titles.

In one embodiment, for each of a plurality of videos in the video category, the classifier subsystem 107 identifies the longest substring in the list of content titles that matches the title of the video in the video category. That is, for a given video in the category, the classifier subsystem 107 compares the video's title to the list of content titles to find a match. The videos from the video category that match the same longest substring in the list of content titles are used as the positive training videos 203 for the title from the list. However, if a video title matches multiple titles in the list of content titles, then the video is not used as a positive training video. For example, consider a video game title "Super Duper Game" included in the list of content titles provided by the third party. A video in the video database 111 titled "My Super Duper Game vs. Giant Man" would not be used as a positive training video because it matches both game titles "Super Duper Game" and "Giant Man."

The training set 201 may also comprise negative training videos 205 for a content source that is associated with the training set 201. Negative training videos 205 are a collection of videos that are representative of content sources that is distinct (i.e., different) from the positive training videos 203 in the training set 201. Thus, the negative training videos 205 are distinct from the content source associated with the training set 201. In one embodiment, the classifier subsystem 107 identifies the negative training videos 205 by randomly selecting videos stored in the video database 111. The classifier subsystem 107 operates under the assumption that the probability of randomly choosing a video showing content associated with the positive training videos 203 is small.

Additionally, the classifier subsystem 107 may also select videos from the video database 111 that are understood to be negative examples of the content shown by the positive training videos 203. For example, if the positive training videos 203 include content of the video game content source "Super Duper Game" the classifier subsystem 107 may identify videos of another game source such as "Giant Man" which are negative examples of "Super Duper Game" In one embodiment, the classifier subsystem 107 utilizes the list of content titles from the third party source to identify negative training videos 205 for the training set 201. The classifier subsystem 107 searches the video database 111 for videos showing content of other titles in the list of content titles.

Alternatively, the classifier subsystem 107 identifies the category of the content associated with positive training videos 203 from metadata provided by the content owner 119 that owns the content source represented by the positive training videos 203. The classifier subsystem 107 then identifies videos of a different category. For example, if the content source associated with the positive training videos 203 is categorized as "video game" content, the classifier subsystem 107 identifies videos of a different category such as "animals" for use as the negative training videos 205.

The foregoing methods for assembling the training sets can be used individually or in any combination.

In one embodiment, the classifier subsystem 107 includes a genre database 207. The genre database 207 comprises a set of genres, each genre associated with a collection of content titles belonging to that genre. The collection of content titles may be received by the third party source or developed by the video hosting service 100. Alternatively, the classifier subsystem 107 may receive the collection of content titles from the content owners 119 associated with the titles, along with information identifying the genre associated with each of the titles. An example of a collection of content titles is a list of video game titles that maps each game title to its associated genre. The list of video game titles may map the "Super Duper Game" video game title to the "action" genre and the "Grand Racing" video game title to the "racing" genre for example. In another example, the genre database 207 may include a list of other types of content such as song titles and each title's associated genre. The list of song titles may include the song title "Don't Stop Believin'" by the group Journey which is mapped to the genre of "rock" and the song title "Ether" by the artist Nas which is mapped to the genre of "hip hop" or "rap." As will be described in further detail below, the genre database 207 is used to train the genre classifiers 209.

The classifier subsystem 107 further comprises a training module 215. In one embodiment, the training module 215 trains the genre classifiers 209 and instance classifiers 211 using training sets 201. That is, the training module 215 trains an instance classifier 211 with its associated training set 201 and trains a genre classifier 209 with its associated training set 201.

As shown in FIG. 2, the training module 215 comprises a feature extraction module 217. The feature extraction module 217 derives features from the various videos in the training sets 201. The feature extraction module 217 uses the derived features from a training set 201 to train the instance classifier 211 associated with the training set 201. The features extracted by the feature extraction module 217 from a particular training set 201 serve as descriptive, quantitative representations of their respective videos for use in training an instance classifier 211 associated with the training set 201. In one embodiment, the following features are derived:

Audiovisual Features:

A number of distinct types of features are extracted from the audiovisual content of the video itself, including some or all of:

- A histogram of local features sampled at sparse interest points using a Laplacian-of-Gaussian (LoG) or Scale Invariant Feature Transform (SIFT) feature extractor, with local descriptors being computed using Gabor wavelet responses at different orientations, spatial scales, and spatial offsets;
- A color histogram computed using hue and saturation in HSV color space;
- Motion rigidity features;
- Pornography detection features based on a boosting-based classifier in addition to frame-based pornography detection features;
- Audio features such as Stabilized Auditory Image (SAI) features and audio spectrogram;
- Color motion defined as the cosine distance of color histograms between two consecutive frames;
- Skin color features;
- Edge features using edges detected by a Canny edge detector in regions of interest;
- Line features using lines detected by a probabilistic Hough Transform;
- A histogram of textons;
- Entropy features for each frame using a normalized intensity histogram and entropy differences for multiple frames;
- Facial features such as a number of faces, or the size and aspect ratio of largest face region, with faces being detected by an extension of the AdaBoost classifier; and
- Shot boundary detection based features using differences of color histograms from consecutive frames.

Textual Features:

The feature extraction module 217 also derives textual features from metadata of the videos in the training set 201 such as N-grams of terms appearing in the title of the video or other text such as comments associated with the videos. In one embodiment, the feature extraction module 217 also infers likely clusters of words for the given textual metadata using Noisy-Or Bayesian networks. (For more details, see, for example, *Learning Bayesian Networks* by R. E. Neapolitan, Prentice Hall, 2003, which is hereby incorporated by reference.) In one embodiment, a taxonomic classifier (e.g., a linear support vector machine) may be used to map the cluster activations to a predefined set of categories, such as "action" or "sports."

The combination of the various features extracted from videos of the training set 201 serves as feature vectors that characterizes the videos in the training set 201. In one embodiment, the features extracted from each positive training video represent a positive feature vector that characterizes that particular video in the positive training videos 203. Thus, the collection of positive feature vectors characterizes the positive training videos 203 in the training set 201. Additionally, the features extracted from each negative training video 205 represents a negative feature vector that characterizes that particular video in the negative training videos 205. Thus, the collection of negative feature vectors characterizes the negative training videos 205 in the training set 201. The feature vectors for the videos of the training set 201 are used to train an instance classifier 211 associated with the training set 201, as now further described.

To train an instance classifier 211, the training module 215 provides the feature vectors extracted by the feature extraction module 217 from the positive training videos 203 and negative training videos 205 associated with the instance classifier 211 as input to a training algorithm. The training algorithm trains the corresponding instance classifier 211 to learn a set of weights on the features of the training videos in the training set 201 so that the instance classifier 211 can recognize uploaded videos comprising content that is based on the content source associated with the instance classifier 211. In one embodiment, the training algorithm is AdaBoost, the details of which are known to one having ordinary skill in the art. In other embodiments, other training algorithms such as linear support vector machine (SVM), neural networks, or decision trees are used to train the instance classifier 211.

In one embodiment, the training module 215 also trains the genre classifiers 209 using the training sets 201. The training module 215 identifies the genre of each video in the positive training videos 203 across all training sets 201 based on the genre information stored in the genre database 207. The training module 215 maps the title of the videos in the positive training videos 203 to their corresponding genre in the genre database 207. The result of the mapping is a collection of videos that are associated with a particular genre.

The training module 215 generates a set of positive feature vectors that characterizes the positive training videos 203 for a given genre and also generates a set of negative feature vectors from the negative training videos 205 for the genre that characterizes videos that belong to other genres. The training module 215 provides the positive and negative feature vectors as input to a training algorithm, which trains the corresponding genre classifier 209 to produce a genre score, as previously described above, indicating the likelihood that an inputted video belongs to the genre associated with the genre classifier 209. In one embodiment, the training algorithm is AdaBoost, the details of which are known to one having ordinary skill in the art. In other embodiments, other training algorithms such as linear support vector machine (SVM), neural networks, or decision trees are used to train the genre classifiers 209.

As mentioned previously, the classifier subsystem 107 comprises genre classifiers 209. Each genre classifier 209 is associated with a particular genre of content and is trained to recognize videos belonging to its associated genre. For example, with respect to video game genres, the genre classifiers 207 may include a "sports" genre classifier, an "action" genre classifier, a "fantasy" genre classifier, a "first person shooter" genre classifier, etc. With respect to sports genres, the genre classifiers 207 may include a "basketball" genre classifier, a "football" genre classifier, a "basketball" genre classifier, a "mixed martial arts" genre classifier, a "golf" genre classifier, and a "racing" genre classifier, etc. The genre classifiers 209 are each trained on the appropriate training sets 201 of videos for their respective genres as previously described above.

When applied to a video—or more specifically, to a feature vector of a video—each genre classifier 209 generates genre information that describes a measure of how strongly the video represents the genre associated with the genre classifier 209. In one embodiment, the genre information comprises a genre score which may be a Boolean score representing whether or not a given video represents the genre corresponding to the genre classifier 209. Alternatively, the genre score is a real number (e.g., ranging from 0.0 to 1.0), integer, or other scalar value representing a measure of likelihood or probability that the video represents the genre corresponding to the genre classifier 209. In one embodiment, numbers or scores exceeding some threshold can be considered to indicate that the video represents the genre associated with the genre classifier 209.

The classifier subsystem 107 further comprises instance classifiers 211 as previously mentioned above. Each instance classifier 209 is associated with a particular content source owned by a content owner 119 and is trained to identify the content source. For example, again with respect to video games, the instance classifiers 211 may include a "Super Duper Game" instance classifier, a "The Legend of Zimra" instance classifier, a "Grand Racing" instance classifier, etc. For example with respect to sporting events, the instance classifiers 211 may include a "U.S. Grand Prix 2011" instance classifier, a "UFC 133" instance classifier, a "Wimbledon 2011" instance classifier, a "PGA Championship 2011" instance classifier, etc. The instance classifiers 211 are each trained on the appropriate training sets 201 of videos for their respective content sources as described above.

Similar to the genre classifiers 209, when applied to a video, each instance classifier 211 generates a classification score which is a measure of likelihood that the video represents the positive training videos that the instance classifier 211 is trained to identify. In other words, a classification score is a measure of likelihood that the video represents the content source associated with the instance classifier 211. In one embodiment, the classification score comprises a Boolean score representing whether or not a given video represents content source associated with the instance classifier 211. Alternatively, the classification score comprises a real number score (e.g., ranging from 0.0 to 1.0), integer, or other scalar value representing a measure of likelihood or probability that the video represents the content source corresponding to the instance classifier 211. In one embodiment, numbers or scores exceeding some threshold can be considered to indicate that the video represents the content source associated with the instance classifier 211.

The video classification module 213 classifies videos applied to the instance classifiers 211. Specifically, the video classification module 213 identifies a title of a content source associated with the content of a video applied to the instance classifiers 211 based on the scores produced by the instance classifiers 211. Note that the title associated with the content of a video may differ from the title of the video itself. For example, a video may be titled "Super Duper Game Rocks!" but the title of the content is "Super Duper Game"

In one embodiment, to classify a video the video classification module 213 identifies an instance classifier 211 that produced a classification score exceeding a threshold value. The video classification module 213 preferably selects the instance classifier 211 that produced a classification score indicating the highest likelihood that the content included in the video matches the content source associated with the instance classifier 211. A score exceeding the threshold value indicates an increased confidence that that the video matches the positive training videos 203 used to train the instance classifier 211. In other words, when a score exceeds the threshold it indicates that the video contains content associated with the instance classifier 211 that produced the score. Note that in alternative embodiments a score below the threshold may indicate the highest likelihood that the video contains content associated with the instance classifier 211 that produced the score.

Consider the example where a given video illustrating video gameplay is applied to the instance classifiers 211. The "The Legend of Zimra" instance classifier may produce a score of 0.5 whereas the "Grand Racing" instance classifier produces a score of 0.1 and the "Super Duper Game" instance classifier produces a score of 0.99. Accordingly, the video classification module 213 determines based on the scores that the given video contains "Super Duper Game" content. Alternatively, if a plurality of instance classifiers 211 produced classification scores indicating that the content in the video is of the content sources associated with the instance classifiers, the video is likely to comprise content from multiple content sources. For example, if both the "Super Duper Game" instance classifier and the "The Legend of Zimra" instance classifier produced classifier scores above the threshold, the video classification module 213 determines that the video contains content from both content sources.

In one embodiment, classifier subsystem 107 requires that the instance classifiers 211 are able to correctly identify the content of a video with at least 95% precision. To achieve this high precision, the classifier subsystem 107 selects a threshold for each instance classifier 211 such that no more than 5% of negative training videos 205 associated with the instance classifier 211 have match probabilities exceeding the threshold.

The video classification module 213 similarly classifies videos applied to the genre classifiers 209. The video classification module 213 identifies the genre of the content of a video that is applied to the genre classifiers 211 based on the scores produced by the genre classifiers 209. In one embodiment, the video classification module 213 identifies a genre classifier 209 that produced the largest score. The largest score indicates the most likely genre associated with the content of the video. Alternatively, the video classification module 213 identifies a score exceeding a threshold value which indicates an increased confidence that the video contains content associated with the genre of the genre classifier 209.

Figure 3:
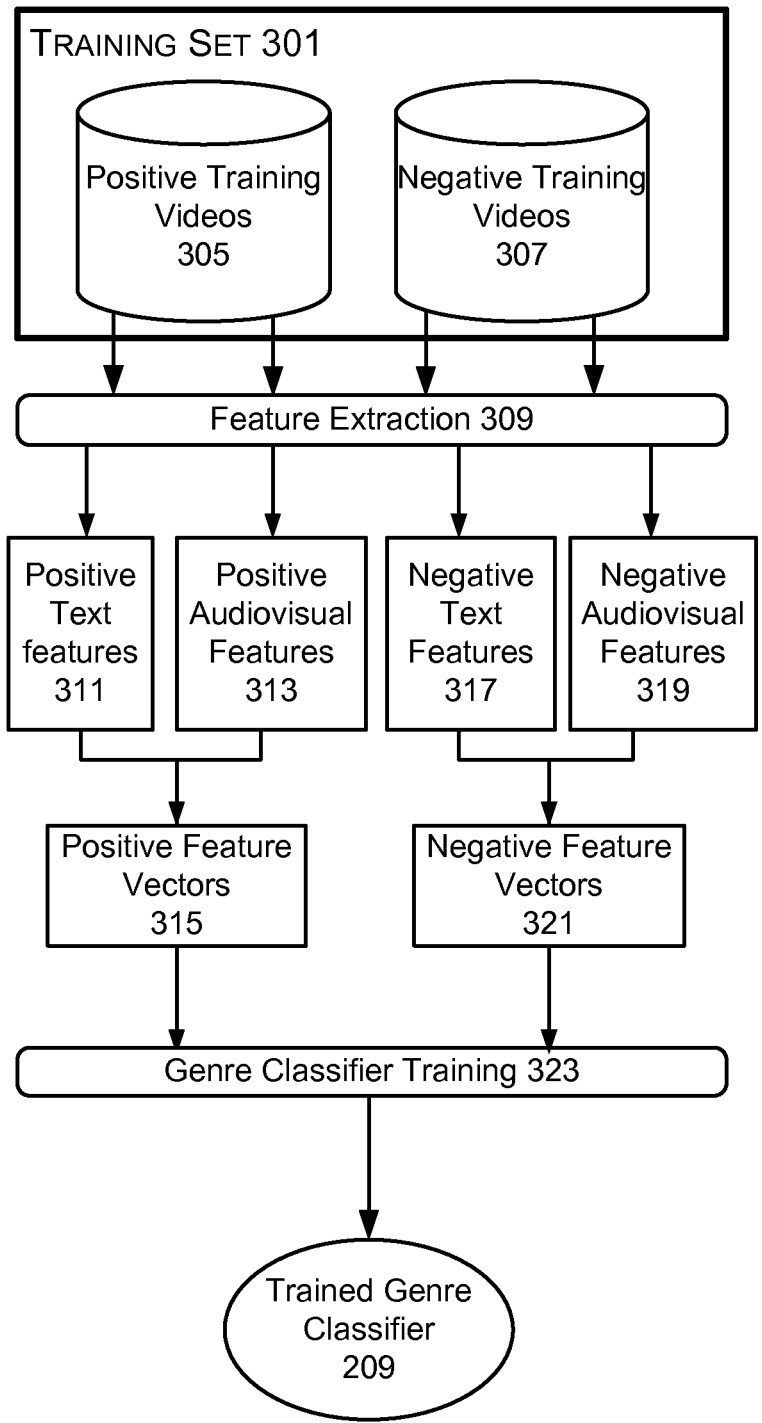
FIG. 3 illustrates a data flow diagram for training a genre classifier, according to one embodiment.

FIG. 3 illustrates a data flow diagram of training of an individual genre classifier by the classifier subsystem 107, according to one embodiment. Note that the following method is performed for each genre classifier 209 in the classifier subsystem 107. For a given genre classifier, the classifier subsystem 107 identifies the training set 301 associated with the genre classifier. As shown in FIG. 3, the training set 301 comprises at least positive training videos 305. The positive training videos 305 include videos that are known to contain content of the genre associated with the genre classifier that is being trained. The training set 301 may also comprise negative training videos 307 that include content of other genres.

The classifier subsystem 107 performs feature extraction 309 on the positive training videos 305 and the negative training videos 307. The classifier subsystem 107 derives positive text features 311 and positive audiovisual features 313 from each of the positive training videos 305. Note that the terms "positive text features" and "positive audiovisual features" refer to textual and audiovisual features that reflect the genre associated with the positive training videos 305. In one embodiment, the classifier subsystem 107 combines the positive text features 311 and the positive audiovisual features 313 derived from each video to create a set of positive feature vectors 315 that describe the positive training videos 305. Similarly, the classifier subsystem 107 derives negative text features 317 and negative audiovisual features 319 derived from each of the negative training videos 307. Note the terms "negative text features" and "negative audiovisual features" refer to textual and audiovisual features that do not reflect the genre associated with the positive training videos 305. Rather, the "negative text features" and "negative audiovisual features" reflect features of other genres derived from the negative training videos 307. The classifier subsystem 107 combines the negative text features 317 and negative audiovisual features 319 derived from each video to create a set of negative feature vectors 321. The classifier subsystem 107 performs genre classifier training 323 of the genre classifier on the resulting feature vectors. The result of the training is a trained genre classifier 209 (e.g., a set of learned weights on the feature vector components) that when provided a feature vector of an arbitrary video can produce a genre score indicating a measure of the degree to which, or the likelihood that, the video belongs to the genre associated with the trained genre classifier 209.

Figure 4:
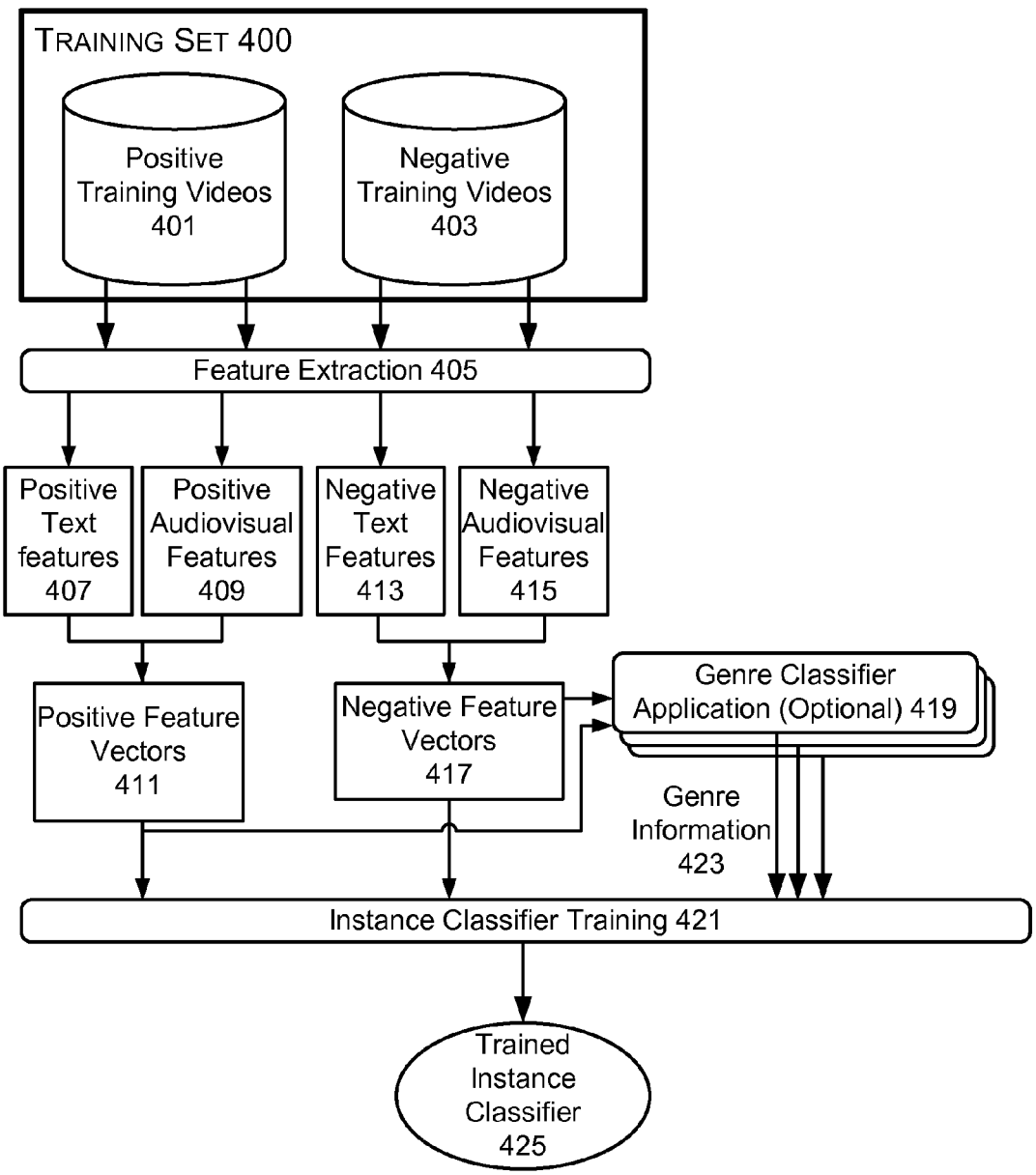
FIG. 4 illustrates a data flow diagram for training an instance classifier, according to one embodiment.

FIG. 4 illustrates a data flow diagram of training of an individual instance classifier by the classifier subsystem 107, according to one embodiment. Note that the following method is performed for each instance classifier 211 in the classifier subsystem 107 and is representative of a two tier classification system.

For a given instance classifier, the classifier subsystem 107 identifies the training set 400 associated with the instance classifier. For example, the instance classifier may be trained to identify video gameplay of the video game content source "SUPER MARIO BROS.™" As shown in FIG. 4, the training set 400 comprises positive training videos 401 that the instance classifier is being trained to recognize. For example, the positive training videos 401 include videos of "Super Duper Game" gameplay if the instance classifier is being trained to identify the "Super Duper Game" content source. The training set 400 may also comprise negative training videos 403 that include content that is different from the content source represented by the positive training videos 401.

The classifier subsystem 107 performs feature extraction 405 on the positive training videos 401 and the negative training videos 403. The classifier subsystem 107 derives positive text features 407 and positive audiovisual features 409 from each of the positive training videos 401. Note that the terms "positive text features" and "positive audiovisual features" refer to textual and audiovisual features that reflect the content source associated with the positive training videos 305. The classifier subsystem 107 combines the positive text features 407 and the positive audiovisual features 409 for each video to create a set of positive feature vectors 411 for the positive training videos 401. Similarly, the classifier subsystem 107 derives negative text features 413 and negative audiovisual features 415 from each of the negative training videos 403. Note the terms "negative text features" and "negative audiovisual features" refer to textual features and audiovisual features that do not reflect the content source associated with the positive training videos 305. Rather, the "negative text features" and "negative audiovisual features" reflect features of other content sources derived from the negative training videos 307. The classifier subsystem 107 combines the negative text features 413 and negative audiovisual features 415 for each video into a set of negative feature vectors 417 for the negative training videos 403.

In one embodiment, the positive feature vectors 411 and the negative feature vectors 417 are inputted into the instance classifier for training. The classifier subsystem 107 uses the positive feature vectors 411, the negative feature vectors 417, and optionally the genre information 423 as will be described below, and performs instance classifier training 421 of the instance classifier. The result of the training is a trained instance classifier 425 (e.g., a set of learned weights on the feature vector components) that when provided a feature vector of an arbitrary video can produce a classification score indicating a measure of the degree to which, or the likelihood that, the video includes content represented by the positive training videos 401.

In a two tier classification system, the classifier subsystem 107 first trains the genre classifiers 209, as illustrated with respect to FIG. 3. Then the feature vectors 411, 417 are applied 419 to the trained genre classifiers 209. Each genre classifier 209 outputs genre information comprising a genre score indicating a likelihood that the videos from which the features were derived includes content of the genre associated with the genre classifier. The outputted genre information is then used in the training 421 of the instance classifier, along with the feature vectors 411, 417 for the corresponding training videos.

Application of the Trained Classifiers

Figure 5:
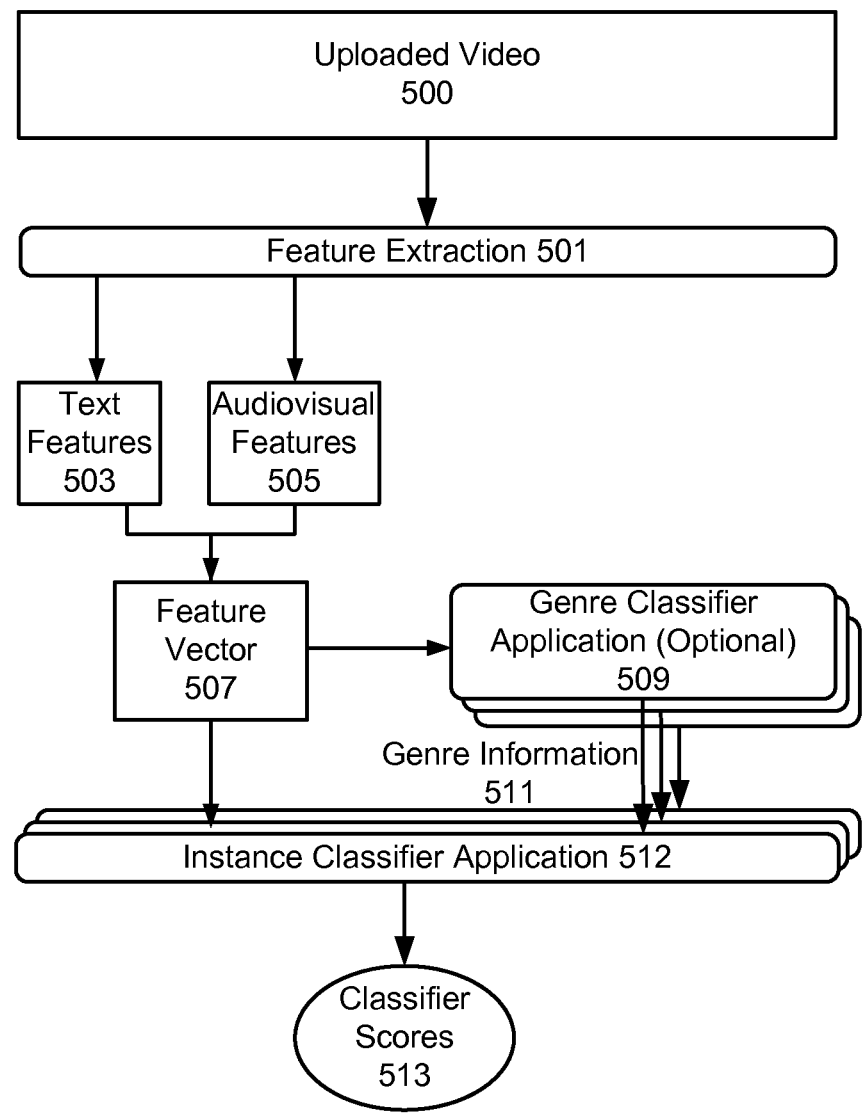
FIG. 5 illustrates a data flow diagram for applying the instance classifier and the genre classifier to an uploaded video, according to one embodiment.

After the training process is complete for the instance classifiers 211, each instance classifiers 211 can, when applied to a video, produce a classification score indicating whether the video contains content associated with the instance classifier 211. FIG. 5 illustrates a data flow diagram for identifying content included in an uploaded video, according to one embodiment. As shown in FIG. 5, the video hosting service 100 receives an uploaded video 500. In one embodiment, the uploaded video 500 comprises P/O content. The video hosting service 100 performs feature extraction 501 on the uploaded video 500. The video hosting service 100 extracts text features 503 and audiovisual features 505 from the uploaded video 500.

The video hosting service 100 combines the text features 503 and the audiovisual features 505 to create a feature vector 507 for the uploaded video. The feature vector 507 is inputted into a plurality of instance classifiers 211 for analysis by the instance classifiers 211. The instance classifiers 211 output classifier scores 513. Each classifier score indicates a measure of how strongly the video represents the content source that the instance classifier 211 was trained to identify.

In one embodiment, the feature vector 507 of the uploaded video 500 is also inputted into a plurality of genre classifiers 209 for an optional application 509 of the genre classifiers to the feature vector 507. Each genre classifier 209 outputs genre information 511 indicative of a genre score. The genre information is utilized by the plurality of instance classifiers 211 to generate the classifier scores 513. In one embodiment, the genre information is used to augment the feature vector 507 of the uploaded video 500 that is provided to the plurality of instance classifiers 211. This beneficially allows the plurality of instance classifiers 211 to learn the weighting of the genre classification resulting from the application 509 of the genre classifiers 209. For example, if a particular genre classifier is inaccurate in its results, an instance classifier 211 can learn to ignore the results provided by that genre classifier.

In one embodiment, the genre information is utilized only by the instance classifiers 211 of the particular genre corresponding to the uploaded video 500. This is beneficial because it reduces the number of instance classifiers 211 that need to analyze the feature vector 507. The classifier subsystem 107 need only apply the feature vector 507 to instance classifiers 211 of the particular genre associated with the genre classifier 209 that produced the genre score indicating a highest likelihood that the video contains content of the genre of the genre classifier 209. For example, if the uploaded video 500 is identified by the genre classifiers 209 as a video of a racing video game, the feature vector 507 for the uploaded video is inputted into a plurality of instance classifiers for different racing video games, to identify the particular video game (i.e., the content source) from which the uploaded video 500 was made.

Content Claiming

Figure 6:
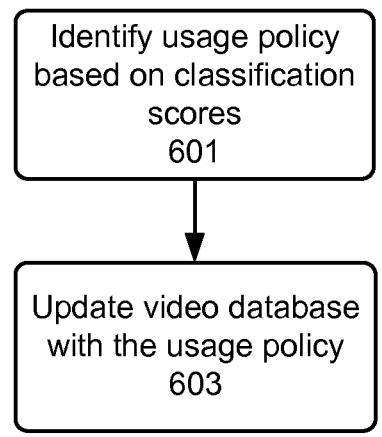
FIG. 6 illustrates a method flow diagram of identifying a usage policy for an uploaded video, according to one embodiment.

Using the classifier subsystem 107 discussed above, the video hosting service 100 can identify the content source of content included in uploaded videos as well as the content owners associated with uploaded videos. Referring now to FIG. 6, there is shown one embodiment of a method performed by the video hosting service 100 to identify a usage policy associated with an uploaded video after the classifier subsystem 107 has generated the classifier scores. Note that in other embodiments, other steps may be performed by the video hosting service 100 other than those illustrated in FIG. 6.

The video hosting service 100 identifies 601 the usage policy for an uploaded video based on the classification scores generated by the video hosting service 100. In one embodiment, the video hosting service 100 identifies from among the collection of instance classifiers, an instance classifier 211 that produced a classifier score exceeding a threshold value. Generally, the highest classification score indicates the instance (e.g., particular content source) for the uploaded video.

Once the content source of the video has been identified, the video hosting service 100 determines the usage policy associated with the content source. The usage policy may be specific to the content source or a general usage policy of the content owner 119 that owns or is otherwise authorized to distribute the content. The usage policy describes how the video hosting service 100 should treat the uploaded video. The video hosting service 100 then updates 603 the record for the video in the video database 111 with an indication of the identified usage policy.

Figure 7:
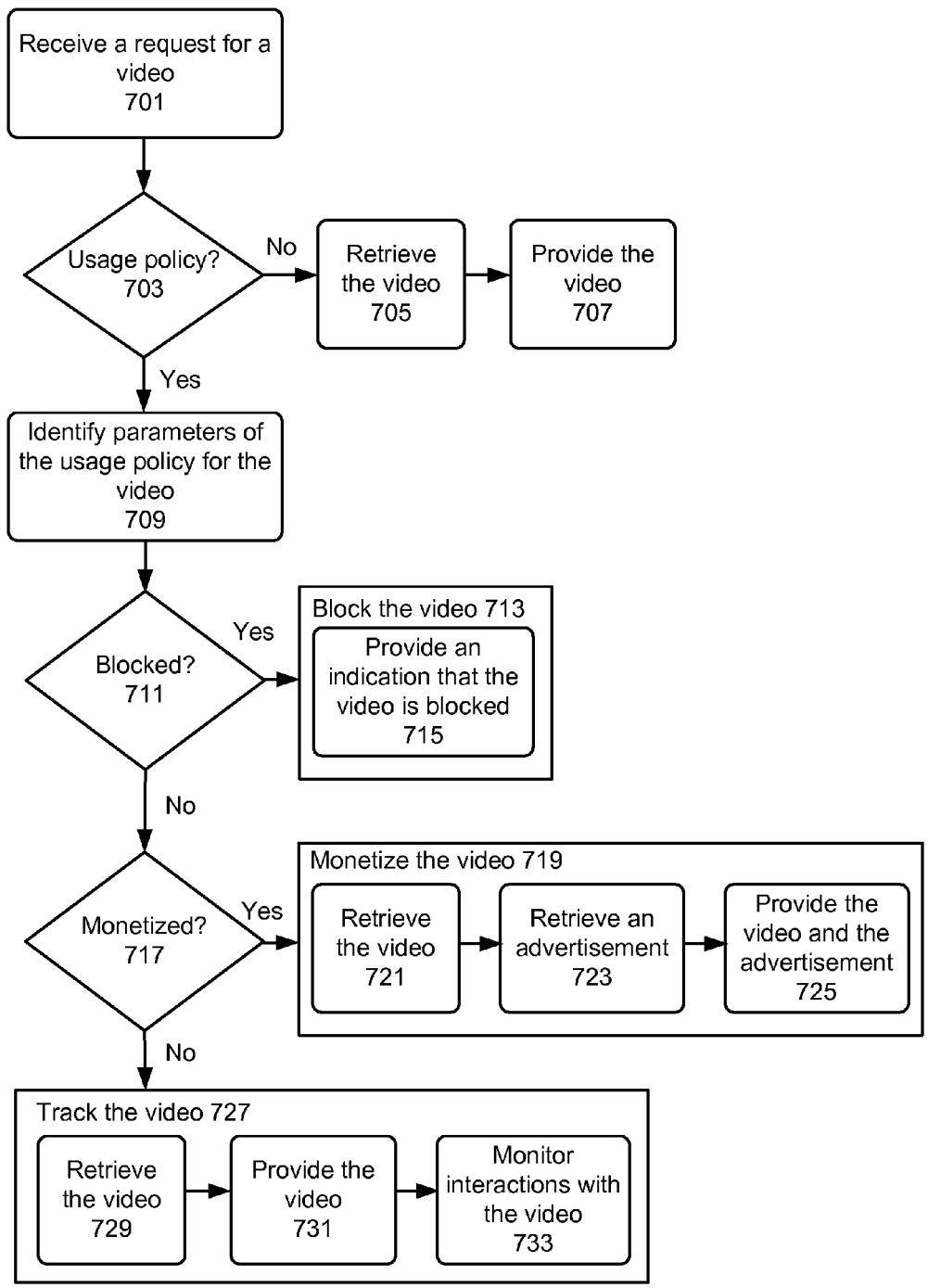
FIG. 7 illustrates a method flow diagram for providing a video according to its usage policy, according to one embodiment.

Referring now to FIG. 7, there is shown one embodiment of a method performed by the video hosting service 100 for providing a video according to its usage policy according to one embodiment. Note that in other embodiments, other steps may be performed by the video hosting service 100 other than those illustrated in FIG. 7.

In one embodiment, the video hosting service 100 receives 701 a request for a video. The request may be represented by a search query received from a client 121 for a video. Alternatively, the request may be represented by receiving a selection from the client 121 of a video provided on a website associated with the video hosting service 100. The video hosting service 100 determines 703 if the video is associated with a usage policy. If not, the video hosting service 100 retrieves 705 the video and provides 707 the video to the client 121 to satisfy the request.

If the video is associated with a usage policy, the video hosting service 100 identifies 709 the usage policy for the video. Note that in the following description, the usage policy is assumed to include only three possible parameters for the usage policy. Note that in other embodiments, the usage policy for a video may include other parameters other than those illustrated in FIG. 7.

The video hosting service 100 determines 711 whether the usage policy indicates that the video is blocked. If the video is blocked, the video hosting service continues to block 713 the video by providing 715 an indication to the client 121 that the video is blocked in one embodiment.

If the video hosting service 100 determines that the usage policy does not indicate that the video is blocked, the video hosting service 100 determines 717 whether the video is monetized. If so, the video hosting service continues to monetize 719 the video. In one embodiment, monetizing the video comprises retrieving 721 the video and retrieving 723 an advertisement for display with the video. The video hosting service 100 provides 725 the video and the advertisement to the client 121 that submitted the request.

If the video hosting service 100 determines that the usage policy does not indicate that the video is blocked, the video hosting service 100 assumes to track 727 the video. Tracking the video includes retrieving 729 the requested video and providing 731 the video to the client 121 that submitted the request. Furthermore, the video hosting service 100 monitors 733 the interactions with the video from the user of the client 121 to determine whether the video should be monetized.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of identifying a usage policy of a video, the method comprising:
receiving a video comprising content captured from a perspective of a user observing an event that is represented by the content of the video;
extracting features from the video, the features comprising audiovisual features extracted from the content of the video;
applying a plurality of classifiers to the video, each classifier trained to identify a content source that is associated with the classifier;
identifying from among the plurality of classifiers, a classifier that generated a score exceeding a threshold value;
assigning a title of a content source associated with the identified classifier to the video;
identifying a usage policy for the video based on the title of the content source, the usage policy describing actions to apply to the video; and
associating the usage policy with the video.

2. The computer-implemented method of claim 1, wherein the content of the video comprises gameplay of a video game.

3. The computer-implemented method of claim 1, wherein the content of the video comprises footage of a live concert.

4. The computer-implemented method of claim 1, wherein the content of the video comprises footage of a live sporting event.

5. The computer-implemented method of claim 1, wherein the content of the video comprises animation created by a user.

6. The computer-implemented method of claim 1, wherein the features further comprise textual features extracted from the content of the video.

7. The computer-implemented method of claim 1, wherein applying the plurality of classifiers comprises, for each classifier:
generating a classification score indicating a measure of likelihood that the content of the video represents a content source associated with the classifier.

8. The computer-implemented method of claim 1, wherein the content source comprises content owned by a content owner.

9. The computer-implemented method of claim 1, wherein the usage policy comprises an action to monetize the video, wherein monetizing the video comprises providing advertisements in conjunction with the video when the video is served.

10. The computer-implemented method of claim 1, wherein the usage policy comprises an action to block the video, wherein blocking the video comprises preventing the video from being displayed to one or more client devices.

11. The computer-implemented method of claim 1, wherein the usage policy comprises an action to track the video, wherein tracking the video comprises monitoring usage interactions with the video to determine whether to monetize the video.

12. The computer-implemented method of claim 1, wherein applying the plurality of classifiers comprises:
applying a second plurality of classifiers to the video, each classifier in the second plurality of classifiers trained to identify a genre that is associated with the classifier; and
wherein each of the plurality of classifiers applied to the video are associated with the identified genre.

13. A computer-implemented method of training a plurality of video classifiers, the method for training each classifier comprising:
accessing a training set of videos associated with a video classifier that is untrained, the training set of videos comprising content that the video classifier is being trained to recognize;
deriving a set of features from the training set, the set of features comprising audiovisual features extracted from the content of the training set;
applying a plurality of trained genre classifiers to the training set of videos;
generating a plurality genre scores based on the application of the plurality of trained genre classifiers, each genre score indicating a likelihood that the content of the training set of videos is of a genre associated with a genre classifier that generated the genre score;
training the video classifier based on the derived set of features and the genre scores, the trained video classifier when applied to a video comprising content captured from a perspective of a user observing an event that is represented by the content of the video produces a classification score indicating a likelihood that content of the video represents the content from the training set of videos; and
storing the trained video classifier.

14. The computer-implemented method of claim 13, further comprising:
 training the plurality of genre classifiers, each genre classifier trained with a set of videos including content of a genre associated with the genre classifier; and
 storing the trained plurality of genre classifiers.

15. The computer-implemented method of claim 13, wherein the content associated with the video classifier comprises gameplay of a particular video game.

16. The computer-implemented method of claim 13, wherein the content associated with the video classifier comprises footage of a concert.

17. The computer-implemented method of claim 13, wherein the content associated with the video classifier comprises footage of a sporting event.

18. A computer-implemented method of identifying a content owner of a video, the method comprising:
 accessing a training set of videos associated with a video classifier that is untrained, the training set of videos comprising content that the video classifier is being trained to recognize;
 deriving a set of features from the training set, the set of features comprising audiovisual features extracted from the content of the set of videos;
 applying a plurality of trained genre classifiers to the training set of videos;
 generating a plurality genre scores based on the application of the plurality of trained genre classifiers, each genre score indicating a likelihood that the content of the training set of videos is of a genre associated with a genre classifier that generated the genre score;
 training the video classifier based on the derived set of features and the genre scores, the trained video classifier when applied to videos produces classification scores indicating a likelihood that content of the videos represents the content from the training set, wherein each video comprises content captured from a perspective of a user observing an event that is represented by the content of the video;
 storing the trained video classifier;
 receiving a video;
 extracting features from the video, the features comprising audiovisual features extracted from the content of the video;
 applying a plurality of classifiers including the trained video classifier to the video, each classifier trained to identify a content source that is associated with the classifier;
 classifying the content of the video based on the application of the plurality of classifiers;
 identifying a usage policy for the video based on the classification, the usage policy describing actions to apply to the video; and
 associating the usage policy with the video.

19. A computer program product comprising a non-transitory computer-readable storage medium containing executable computer program code for identifying a usage policy of a video, the code when executed are for:
 receiving a video comprising content captured from a perspective of a user observing an event that is represented by the content of the video;
 extracting features from the video, the features comprising audiovisual features extracted from the content of the video;
 applying a plurality of classifiers to the video, each classifier trained to identify a content source that is associated with the classifier;
 identifying from among the plurality of classifiers, a classifier that generated a score exceeding a threshold value;
 assigning a title of a content source associated with the identified classifier to the video;
 identifying a usage policy for the video based on the title of the content source, the usage policy describing actions to apply to the video; and
 associating the usage policy with the video.

20. The computer program product of claim 19, wherein the content of the video comprises gameplay of a video game, footage of a live concert, a live sporting event, or animation created by a user.

21. The computer program product of claim 19, wherein the code when executed is further for:
 generating a classification score indicating a measure of likelihood that the content of the video represents a content source associated with the classifier.

22. The computer program product of claim 19, wherein the usage policy comprises an action to monetize the video, wherein monetizing the video comprises providing advertisements in conjunction with the video when the video is served.

23. The computer program product of claim 19, wherein the usage policy comprises an action to block the video, wherein blocking the video comprises preventing the video from being displayed to one or more client devices.

24. The computer program product of claim 19, wherein the usage policy comprises an action to track the video, wherein tracking the video comprises monitoring usage interactions with the video to determine whether to monetize the video.

25. The computer program product of claim 19, wherein the code when executed is further for:
 applying a second plurality of classifiers to the video, each classifier in the second plurality of classifiers trained to identify a genre that is associated with the classifier; and
 wherein each of the plurality of classifiers applied to the video are associated with the identified genre.

26. A computer program product comprising a non-transitory computer-readable storage medium containing executable computer program code for training a plurality of video classifiers, the code when executed are for:
 accessing a training set of videos associated with a video classifier that is untrained, the training set of videos comprising content that the video classifier is being trained to recognize;
 deriving a set of features from the training set, the set of features comprising audiovisual features extracted from the content of the training set;
 applying a plurality of trained genre classifiers to the training set of videos;
 generating a plurality genre scores based on the application of the plurality of trained genre classifiers, each genre score indicating a likelihood that the content of the training set of videos is of a genre associated with a genre classifier that generated the genre score;
 training the video classifier based on the derived set of features and the genre scores, the trained video classifier when applied to a video comprising content captured from a perspective of a user observing an event that is represented by the content of the video produces a classification score indicating a likelihood that content of the video represents the content from the training set of videos; and
 storing the trained video classifier.

27. The computer program product of claim 26, wherein the code when executed is further for:
    training the plurality of genre classifiers, each genre classifier trained with a set of videos including content of a genre associated with the genre classifier; and
    storing the trained plurality of genre classifiers.

28. The computer program product of claim 26, wherein the content comprises gameplay of a video game, footage of a live concert, a live sporting event, or animation created by a user.

29. A computer system for identifying a usage policy of a video, the system comprising:
    a computer processor;
    a computer-readable storage medium comprising executable computer program code when executed by the computer processor is for:
        receiving a video comprising content captured from a perspective of a user observing an event that is represented by the content of the video;
        extracting features from the video, the features comprising audiovisual features extracted from the content of the video;
        applying a plurality of classifiers to the video, each classifier trained to identify a content source that is associated with the classifier;
        identifying from among the plurality of classifiers, a classifier that generated a score exceeding a threshold value;
        assigning a title of a content source associated with the identified classifier to the video;
        identifying a usage policy for the video based on the title of the content source, the usage policy describing actions to apply to the video; and
        associating the usage policy with the video.

30. A computer system for training a plurality of video classifiers, the system comprising:
    a computer processor;
    a computer-readable storage medium comprising executable computer program code when executed by the computer processor is for:
        accessing a training set of videos associated with a video classifier that is untrained, the training set of videos comprising content that the video classifier is being trained to recognize;
        deriving a set of features from the training set, the set of features comprising audiovisual features extracted from the content of the training set;
        applying a plurality of genre classifiers to the training set of videos;
        generating a plurality genre scores based on the application of the plurality of genre classifiers, each genre score indicating a likelihood that the content of the training set of videos is of a genre associated with the genre classifier that generated the genre score;
        training the video classifier based on the derived set of features and the genre scores, the trained video classifier when applied to a video comprising content captured from a perspective of a user observing an event that is represented by the content of the video produces a classification score indicating a likelihood that content of the video represents the content from the training set of videos; and
        storing the trained video classifier.

* * * * *